March 18, 1941.   H. KLEMA   2,235,582
DISCHARGE NOZZLE HOLDER FOR MACHINE TOOLS
Filed Dec. 28, 1939   2 Sheets-Sheet 1
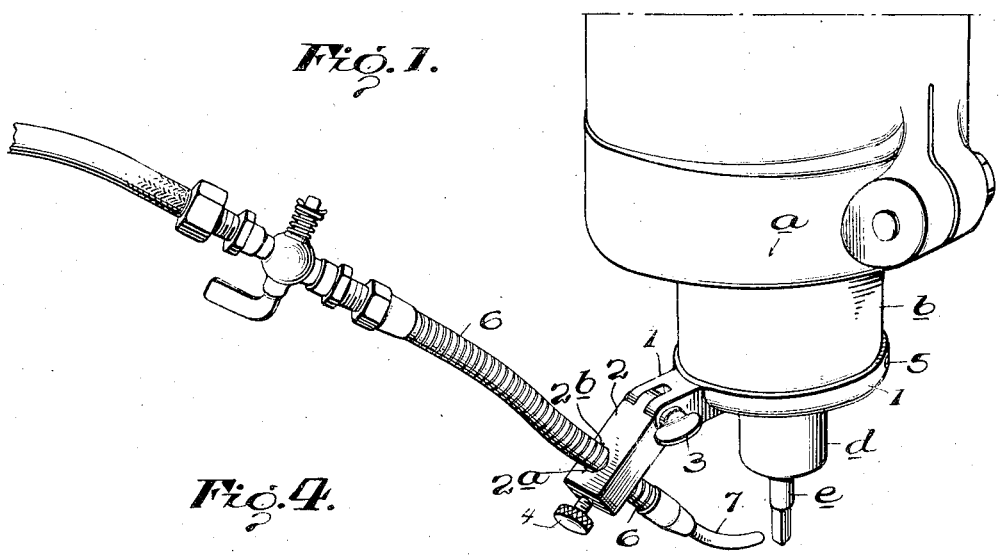
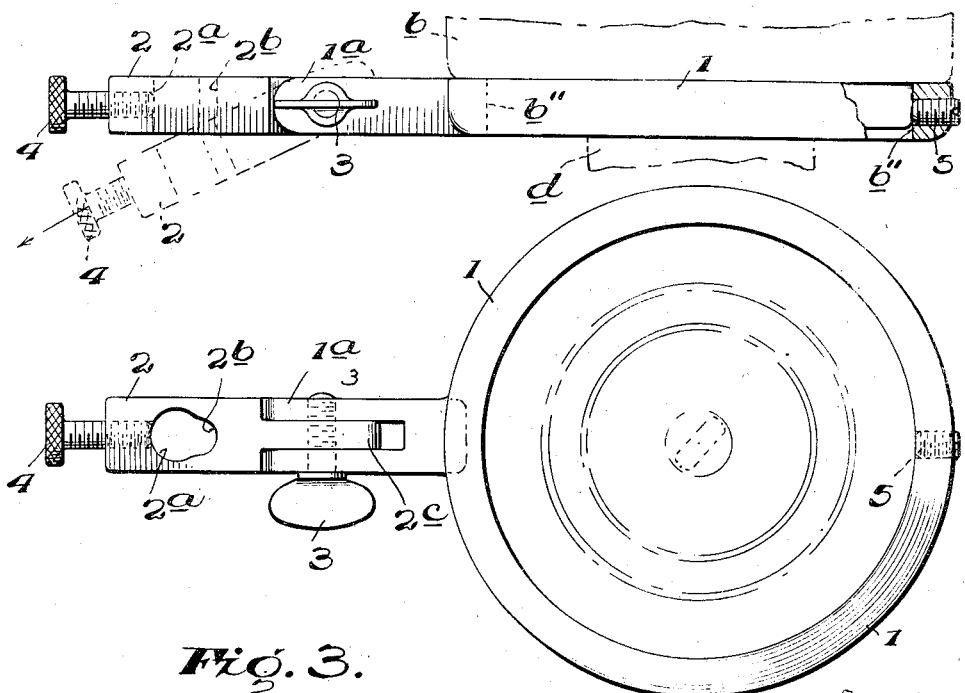
Inventor
Harlow Klema.
By Peck & Peck
Attorneys

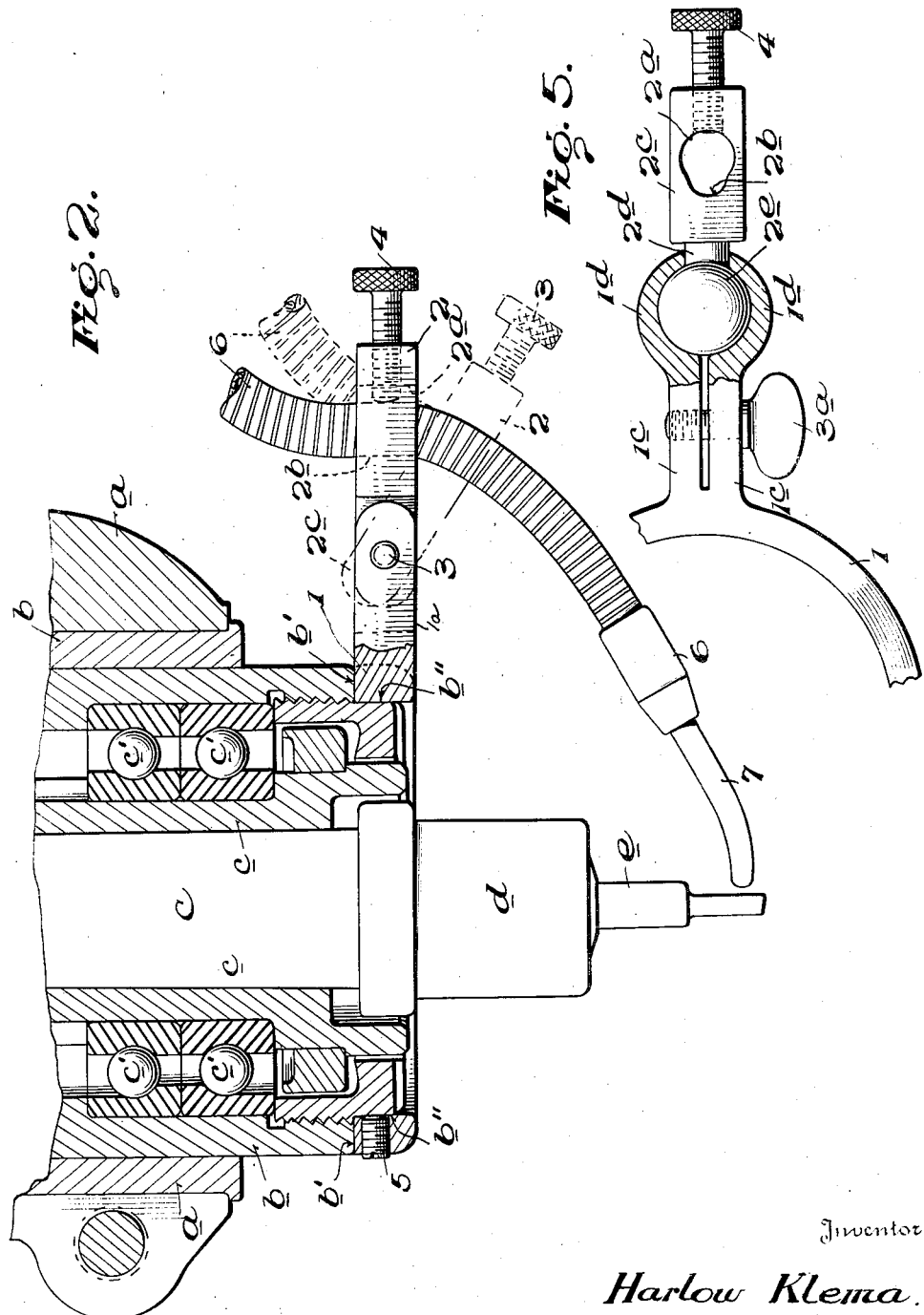

Patented Mar. 18, 1941

2,235,582

UNITED STATES PATENT OFFICE 2,235,582

DISCHARGE NOZZLE HOLDER FOR MACHINE TOOLS

Harlow Klema, Racine, Wis., assignor, by mesne assignments, to George Gorton Machine Co., Racine, Wis., a corporation of Wisconsin Application December 28, 1939, Serial No. 311,409

6 Claims. (Cl. 90—11)

This invention relates to discharge nozzle holders for machine tools, and the objects and nature of the invention will be understood in the light of the following description of the accompanying drawings illustrating an example mechanical expression or embodiment of the invention from among other forms and modifications within the spirit and scope thereof.

It is common practice in machine tool operation, to provide a hose leading from a fluid supply source, wherein the fluid, for instance liquid coolant, can be under pressure, to maintain a more or less constant flow thereof under more or less pressure through a discharge outlet, such as a nozzle, onto or against the desired critical portion of the longitudinally feedable rotary cutter, while such cutter is operating, particularly, for cutter cooling and/or lubrication, and possibly incidental chip removal. The fluid supply hose commonly employed usually has at least its terminal portion composed of a length of flexible metal tubing at its free end coupled to and carrying a suitable guiding and directing contracted discharge nozzle. The discharge nozzle has heretofore been usually positioned with more or less uncertainty to deliver the fluid discharge against the operating cutter, by bending the metal tubing portion of the fluid supply hose. However, the fluid hose is in common practice, usually tied or clamped to or hung from an upper portion of the machine tool frame or upper part fixed thereto, with the end portion of the hose carrying the discharge nozzle, of substantial length, hanging more or less freely with a tendency to sag or otherwise change its position with respect to the operating cutter. In practice, it is necessary to constantly maintain the relative vertical positions between the discharge nozzle and the cutter while operating on the work, to constantly maintain the delivery of the desired fluid against the critical portion of the cutter while cutting the work. To serve its purpose with the required high efficiency, the fluid, for example, liquid coolant must be delivered at a certain critical portion or point along the operating cutter for proper cooling and/or lubrication. Under the common practice, above noted, the machine operator must more or less constantly observe the fluid delivery discharge, to see that the discharge nozzle is constantly in the proper relative position with respect to the operating cutter, and must bend the hose to properly position the same, if the nozzle has dropped, shifted or otherwise moved for any reason from proper position, or if the cutter in its longitudinal movements has departed vertically from proper relative position with respect to the nozzle. This attention to the nozzle and fluid discharge, on the part of the operator, detracts from required attention to the cutting operation, and becomes a more or less constant annoyance.

An object of the invention is to provide in a machine tool cutter head having a longitudinally feedable, usually, rotary cutter, a discharge nozzle from a fluid supply hose capable of being positioned and set with respect to the cutter of the vertical cutter spindle, with means for so supporting and carrying said nozzle as to require the same to move both vertically and laterally with the cutter spindle to constantly maintain the predetermined set relative position of said nozzle with respect to the cutter during all cutter movements, and assure constant flow of fluid to the desired portion of the operating cutter whether or not the fluid is liquid coolant, or the like or a spray of liquid and air or gas, or more or less high pressure air or gas.

A further object of the invention is to provide improved mechanism for constantly holding the fluid discharge nozzle in the proper relative position with respect to the longitudinally movable cutter while it is operating on the work, to deliver the fluid flow at the critical portion of the operating cutter, and thereby relieve the machine tool operator from watching and adjusting said nozzle from time to time, after he has through the medium of such mechanism, properly set and adjusted the nozzle.

A further object of the invention is to provide fluid discharge nozzle holding mechanism for application to the barrel or quill that carries the cutter for longitudinal and other movements therewith, to thereby support and carry both the cutter and the nozzle together and simultaneously, vertically or longitudinally and thus constantly maintain the nozzle in the relative vertical or other position with respect to the cutter, in which said nozzle has been adjusted and set.

And a further object of the invention is to provide a suitable bracket for more or less rigid attachment to the longitudinally or vertically movable support that carries the cutter spindle vertically and in other directions, and to provide such bracket with a suitably adjustable clamp or holder for the free discharge nozzle carrying end of the fluid supply hose, designed to constantly maintain said nozzle in the position to which set with respect to the cutter throughout the longitudinal and other movements of the cutter while operating on the work.

With the foregoing objects in view among others developed by the following description, the invention consists in certain novel features in organization, combination, and structure, as more fully hereinafter explained and specified by the appended claims.

In the accompanying drawings forming a part hereof, and illustrating embodiments of the invention as examples for purposes of explanation:

Fig. 1 is a perspective view showing an embodiment of my invention combined with the cutter head of a machine tool having a vertical rotary cutter spindle mounted for longitudinal movement.

Fig. 2 shows the cutter head in part in vertical central section with the holder and its support, for the fluid supply hose and its discharge nozzle applied to the slide barrel carrying the rotary cutter spindle, dotted lines indicating various positions to which the holder can be adjusted.

Fig. 3 shows the holder and its support in top plan, dotted lines indicating the position of the cutter spindle slide barrel.

Fig. 4 shows the embodiment of the holder and its support in edge elevation, partially broken away, dotted lines indicating the position of the lower end of the cutter spindle slide barrel, dotted lines also showing the holder in an adjusted position.

Fig. 5 shows another or modified embodiment of the invention in top plan and horizontal section, the collar forming support being partially broken away.

I happen, to show, as an example from among various machines to which my invention can be adapted and applied, a portion of the cutter head of a vertical rotary cutter spindle machine, say a machine tool of the milling, die-sinking, duplicating, or other type.

In the drawings, the lower portion $a$, of the vertical tubular supporting cutter head is shown. Within this cutter head, the vertical non-rotary barrel or quill $b$, is longitudinally slidable vertically, suitable feed means, not shown, being provided for thus actuating the barrel. In this particular example, the barrel $b$, depends below the cutter head $a$, and at its lower extremity is surrounded by an annular recess providing a top downwardly facing annular shoulder or seat $b'$, and a vertical cylindrical circumferential surface $b''$, of reduced diameter.

The vertical rotary cutter spindle $c$, is carried by the slide barrel and is suitably rotatably mounted in said barrel against end and radial thrust, as for example, by end and radial thrust bearings $c'$, among others. This rotary cutter spindle is arranged longitudinally and centrally within the barrel and is carried vertically thereby as the barrel moves longitudinally.

The rotary cutter spindle depends below the barrel and at its lower end is usually equipped with a suitable chuck or collet $d$, to removably clamp a suitable depending vertical cutter $e$, to the cutter spindle in axial alinement therewith and in rotary driven relation thereto. This cutter can be of the milling, routing, drilling or any other type requiring the constant flow of fluid, for example, liquid coolant to the necessary critical point or portion thereof while cutting the work.

I have solved the hereinbefore explained problem, by the provision of fluid discharge nozzle holder means so included in the cutter head organization as to move vertically and laterally with the cutter spindle, to maintain the desired relative position of the fluid discharge nozzle with respect to the spindle cutter constant during all operative vertical and lateral movements of the cutter while operating on the work. Thus, the arrangement, is then such that the discharge nozzle when once adjusted and set by said holder in the required operative position with respect to the cutter operating cutter will thus remain throughout all cutter vertical and lateral movements during the work cutting operation.

In the particular example embodiments illustrated, the desired result is attained by securing any suitable supporting bracket for a suitable discharge nozzle holder, to the vertically movable barrel $b$, that carries and in which the cutter spindle $c$, is rotatably mounted against substantial relative longitudinal movements.

For example, without intending to so limit all features of the instant invention, in the particular embodiments illustrated, the bracket disclosed in the form of a collar 1, of a size and form to more or less loosely slip longitudinally onto the cylindrical circumference $b''$, of the reduced lower end portion of the cutter-spindle carrying barrel $b$, to abut the top shoulder $b'$, thereof. In this instance, suitable means is provided for normally rigidly clamping the bracket to the cutter spindle barrel. Where the bracket takes the form of a non-split collar somewhat loosely seated on and around the barrel, the collar can be formed with a screw threaded hole extending radially therethrough, with a clamping set screw 5, extending therethrough for adjustment to fixedly clamp the collar on the barrel against relative movement or to loosen the collar for removal or for rotary adjustment around the barrel to bring the discharge nozzle 7, to a desired angular position at any point within a circle surrounding the cutter.

In the instant example, the holder supporting bracket includes a rigid arm 1$a$, if so desired, integral with or otherwise fixed thereto and, if so desired projecting radially from the collar 1. This arm carries any suitable hose holder, as for example holder 2, preferably, adjustable to any suitable angular position with respect to said arm, and settable fixedly with respect to said arm in the position to which adjusted. For instance, the hose holder can consist of an elongated strong stiff block 2, having a hose receiving passage extending transversely therethrough. For example, this passage can be in the form of hole 2$a$, preferably of a diameter to permit the free end portion 6, of the hose to slip somewhat freely therethrough. This free end portion of said hose is preferably composed of a section of coiled metal so-called bendable tube 6, which is usually of sufficient stiffness to substantially remain in the form to which bent.

The metal discharge nozzle 7, is coupled to the free end of the metal tube portion of the hose 6.

The hose passage 2$a$, in the hose holder is preferably formed with a side recess or bay 2$b$, of a reduced radius to cooperate with the hose clamping screw 4, in locking the hose 6, in the holder against relative movements, although I do not wish to so limit the invention, as the passage where large enough for the hose to be threaded therethrough need not have the side bay or recess, as the hose can be readily clamped or otherwise secured to the block whatever the shape of the block passage or socket that receives the hose. The holder 2, can be formed with a screw threaded hole for the reception and adjustment of screw 4, with said hole extending longitudinally through the block from its free end extremity into the enlarged portion of vertical passage 2a, opposite side recess 2a.

Any suitable means can be employed, if so desired, for coupling the holder 2, to the bracket arm 1a, although it is within the spirit of my invention to provide the holder 2, as a rigid portion of the bracket, such as the arm 1a, thereof. However, I prefer to pivotally couple the holder 2, to the bracket arm 1a, for vertical swinging adjustment on a horizontal or transverse axis, for example, on the transverse axis 3. For example, the holder 2, can be formed rigid with a longitudinally projecting tenon, normally loosely fitting into the bifurcated or longitudinally forked end of arm 1a, with a pivot forming pin 3, extending transversely through said intermeshed portions of arm 1a, and holder 2, and forming the axis on which holder 2, is vertically swingable. This pin 3, in the example illustrated, is in the form of a wing head or finger clamping screw, meshing with the internal screw threaded hole in one of the legs of the bifurcated arm 1a, to permit rotation of the screw to rigidly clamp the holder 2, in any desired vertical position, and rotation of the screw in the opposite direction to free the tenon of holder 2, for rotation on screw 3, as an axis.

Various types of vertically or otherwise adjustable and settable holders for the fluid discharge nozzle can be employed, whether attached direct to the cutter spindle slide barrel, or coupled thereto through the medium of a support, for example, collar 1. For instance, in Fig. 4, any suitable support for application to the rotary cutter spindle slide barrel, for example, collar 1, is provided with an outwardly projecting exterior arm rigid therewith, and this arm is constructed to form a pair of complementary substantially-parallel spring arms 1c, normally spaced apart and capable, under sufficient pressure, of being forced toward each other. The free ends of these arms 1c, form complementary facing cup-like or approximately semi-spherical jaws or sockets 1d, that receive the approximately spherical ball 2e, rigid with neck 2d, that is rigid with and projects from the inner end of the fluid nozzle holder 2c, which, if so desired, can be otherwise substantially the same as holder 2. The adjoining edges of the facing complementary cups 1d, are spaced apart for the accommodation of the neck 2d, and to permit the same to move vertically between the edges of said cups as the holder 2c, is adjusted vertically. The ball 2e, is clamped rigidly by and between the two cups, by the operation of the thumb screw 3a, passing transversely through said spring arms 1c, and screw threaded to at least one of said arms. By rotation of the screw to draw the arms toward each other the ball is clamped to maintain holder 2c, in the adjusted position. By turning the screw in the opposite direction, the arms spring apart to permit adjustment of the holder 2c, vertically.

When the supporting bracket is applied to the cutter spindle barrel for carrying thereby and moving vertically therewith, the free end of the hose 6, can be threaded by its nozzle 7, down through the vertical passage 2a, in holder 2, the clamping screw 4, having been withdrawn from said passage. A sufficient length of hose 6, can be pulled through the holder 2, to permit proper location of the nozzle beside the cutter e, by bending the metal tube section below holder 2, or by swinging said holder to the required angular position and there locking the same by clamping screw 3. The metal tube portion of the hose can be clamped to the holder by clamp screw 4, before or after the holder is clamped in its horizontal or some position inclined to the horizontal as circumstances require. By rotation of bracket 1, on the cutter spindle barrel the discharge nozzle can be moved latterally along a horizontal arcuate path of movement around the cutter e, to any desired substantially radial position with respect to said cutter, and by vertical swing or adjustment of holder 2, the discharge nozzle can be adjusted laterally or radially toward and from the cutter. The nozzle when the metal tube is bent and adjusted to bring the nozzle to the critical position with respect to the cutter, will remain constantly in such position throughout vertical and other movements of the cutter. The low down position of the bracket and its hose holder with respect to the cutter reduces the free end length of hose below the clamp, and thereby reduces the possibility of the nozzle becoming displaced from its proper set position by vibration or other causes.

The fluid discharge nozzle is primarily employed for discharging liquid coolant against a critical part of the operating cutter, and in some instances can be employed for discharging a pressure spray of liquid and gas, for example, air, or in other instances gas, for example, air, in all of which instances, for whatever purpose, the fluid jet or spray is directed against a predetermined portion of the operating cutter and this set relative positioning of the nozzle with respect to the cutter should be maintained through vertical and lateral operative movements of the cutter.

The disclosure hereby made is for purposes of explanation of example embodiments, and not for purposes of limitation, as various possible modifications, changes, and variations fall within the spirit and scope of the invention defined by the following claims.

What I claim is:

1. A fluid discharge nozzle carrier for the vertically movable cutter spindle of a machine tool; comprising a supporting bracket, and a holder for the nozzle carrying free end of a fluid supply hose, said holder adjustable and settable with respect to said bracket, said bracket adapted to be secured to carry the hose nozzle vertically with the vertical movements of said cutter spindle.

2. A support for the discharge nozzle carrying end of a fluid supply hose, for the purposes substantially as described, comprising a collar-like supporting bracket, and a hose holding clamp carried by and pivotally coupled to said bracket for vertical swing on a transverse axis and provided with means for setting the same in the position to which swung.

3. In a machine tool cutter head having a vertical cutter spindle carried by a non-rotary longitudinally slidable barrel, said barrel at its lower end portion having a surrounding seat, and a fluid supply hose having a laterally and vertically shiftable depending free end provided with a discharge nozzle; a support fitting said seat and normally secured to said barrel, and a holder projecting from and adjustable with respect to said support, the free end of said hose being carried by said holder and positioned to maintain said nozzle in a predetermined position with respect to said cutter.

4. A machine tool comprising a cutter head having a rotary cutter spindle, a barrel mounted in said head for relative longitudinal cutter-spindle-feeding and return movements, said cutter spindle being mounted in said barrel against normal relative longitudinal movements, a fluid supply hose provided with a shiftable discharge portion for delivering fluid on the operating cutter of said spindle; and hose holder means movable with said barrel and holding said discharge portion in an elevated critical position with respect to said cutter for maintaining said critical position by correspondingly moving said discharge portion throughout said cutter-spindle-feeding and return movements of said barrel.

5. A machine tool comprising a cutter head having a normally non-rotary barrel relatively movable in said head toward and from the work, a rotary cutter spindle arranged longitudinally of said barrel and mounted therein against normal longitudinal relative movements and carried thereby on its cutter-spindle-feeding and return movements, a fluid supply hose having an end discharge nozzle, a support moving with said barrel, and a holder projecting from and adjustable with respect to said support, the nozzle end portion of said hose being upheld by said holder and set thereby to maintain said nozzle in a predetermined position with respect to the cutter of said spindle, by correspondingly moving the nozzle with the barrel during said cutter spindle feed and return movements of said barrel.

6. A support for the discharge nozzle portion of a fluid supply hose, said support comprising a supporting bracket formed for securing in the desired angular position to the depending end portion of the rotary-cutter-spindle-carrying non-rotary barrel of a cutter head in which said barrel is relatively longitudinally movable on its cutter-spindle-feeding and return movements, and a hose clamping holder projecting from and carried by said bracket and relatively adjustable and settable with respect thereto, said holder providing a vertical transverse passage through which said hose and nozzle are threadable and longitudinally adjustable for positioning and maintaining the nozzle in an elevated critical position with respect to the cutter of said spindle throughout said cutter-spindle-feeding and return movements of said barrel.

HARLOW KLEMA.